May 7, 1929.  M. CHIROL  1,712,377
TUNED ELECTRICAL SERVO MOTOR DEVICE
Filed Sept. 23, 1927
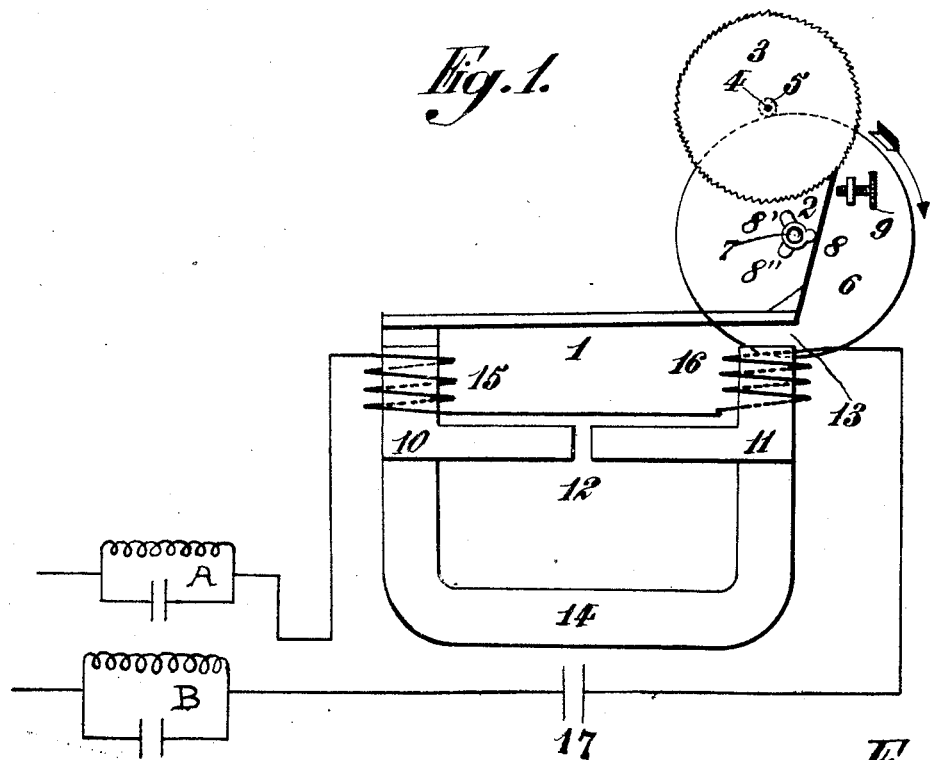
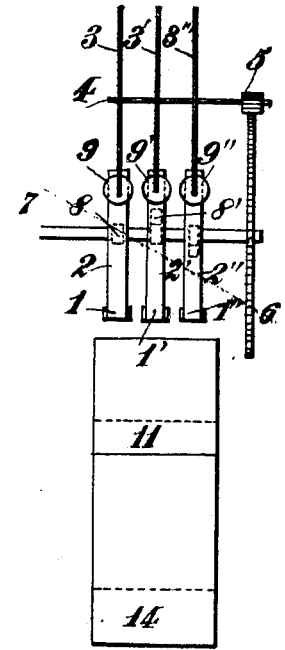
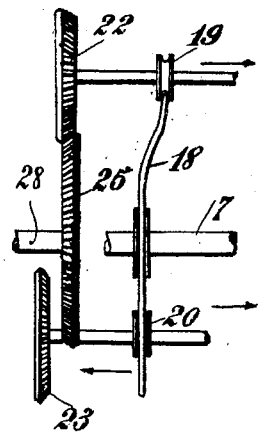
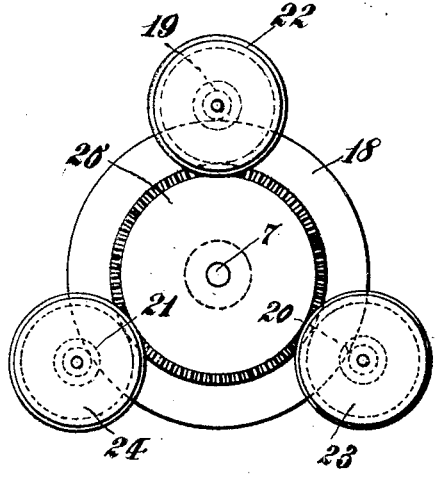
Inventor
Maurice Chirol
by Wilkinson & Giusta
Attorneys.

Patented May 7, 1929.

1,712,377

UNITED STATES PATENT OFFICE.

MAURICE CHIROL, OF PARIS, FRANCE, ASSIGNOR TO COMPAGNIE POUR LA FABRICATION DES COMPTEURS ET MATERIEL D'USINES A GAZ, OF MONTROUGE, FRANCE, A JOINT-STOCK COMPANY.

TUNED ELECTRICAL SERVO-MOTOR DEVICE.

Application filed September 23, 1927, Serial No. 221,567, and in France April 8, 1927.

The servo-motor which is the object of the present invention enables a certain number of distinct operations to be performed at a distance and by only utilizing two conductors, each of said operations corresponding to an alternating current of given frequency emitted at the controlling station.

The present invention in combination with French Patent No. 626,867 filed December 30, 1926, is particularly applicable to the variable tariff rating of electrical energy.

The invention may likewise be applied in other ways, but, by way of example, the inventor will confine himself to mentioning the rewinding and resetting of electric clocks to time and the telecontrol of switch-boards in electrical energy distributing sub-stations.

According to the invention, the servo-motor device comprises a polarized electro-magnet mounted in series with a capacity tuned to the mean value of the frequencies used, said electro-magnet acting on a plurality of vibrating magnetic reeds whose natural periods of vibration respectively agree with the frequencies employed, the alternating movements of the vibrating reeds being transformed into a rotational movement through the medium of a plurality of ratchets adapted to be automatically and individually thrown out of operating position as soon as the required operation has been executed, through the medium of a series of suitably driven cams.

The ratchets according to the present invention are constituted by flat springs fixed to the free ends of the vibrating reeds and acting as pawls on ratchet wheels which are mounted on a common shaft, whilst adjustably positioned stops are arranged in such manner as to damp the vibrations which might impair the action of the pawls, by checking these latter's displacement so as not to exceed unduly the outer diameter of the ratchet wheels.

The invention will be more readily understood from the following detailed description about to be made thereof in conjunction with the accompanying drawings in which:

Fig. 1 illustrates diagrammatically how the device may be adapted to provide three separate tariff ratings in an electrical energy measuring instrument.

Fig. 2 is an end view of Fig. 1.

Figs. 3 and 4 show a device through the medium of which the servo-motor according to the invention can act on the clutches of a tariff meter's register.

In these figures, 1, 1', 1'' respectively designate three magnetic vibrating reeds fixed at one of their ends and respectively tuned to vibrate at the narrowly differing frequencies $f, f', f''$; 2, 2', 2'' respectively designate three flat springs fixed to the free ends of the three blades 1, 1', 1'' so as to act as pawls on ratchet wheels 3, 3', 3'' mounted on a common shaft 4; 5 is a pinion fixed to 4 which rotates a wheel 6 mounted on a shaft 7, with a suitable speed reduction; 8, 8', 8'' respectively denote three cams mounted on the shaft 7 and each offset at 120° from the others, said cams being so arranged that the rotation of the shaft 7 in the direction of the arrow successively throws the three ratchets 2—3, 2'—3' and 2''—3'' out of action; 9, 9', 9'' respectively refer to three adjustable stops intended to damp the vibrations of 2, 2', 2''; 10 and 11 are sheet iron yokes forming a magnetic circuit comprising two air-gaps 12 and 13; 14 is a permanent magnet serving to polarize the yokes 10 and 11; 15 and 16 are two windings mounted in series with a capacity 17 adjusted to enter into resonance at the mean frequency $f'$.

It will be seen forthwith that if 15 and 16 are excited by an alternating current of frequency $f, f'$, or $f''$, one of the three reeds 1, 1', 1'' will start vibrating and that the shaft 7 will be rotated in the direction of the arrow by one of the ratchets 2—3, 2'—3', 2''—3'' until 8, 8' or 8'' declutches the ratchet which has been set in action. Consequently the shaft 7 will have a definite stopping position for each of the frequencies $f, f'$, or $f''$. The change in tariff rating will be obtained, for example, by causing the shaft 7 to act on the clutches of the meter's register, through a cam and in known manner as illustrated in Figs. 3 and 4 in which the cam 18 keyed to the shaft 7 is so designed as to shift, through its rotation, one of three pulleys 19, 20, 21 in turn to the right, whilst the remaining two are shifted to the left, such shifts to the right and left respectively causing engagement and disengagement of the tariff meter wheels 22, 23, 24 with a driving pinion 25 keyed to the tariff meter shaft 28.

It should be pointed out that, other things being equal and whatever the number of operations to carry out may be, the work that a given motor can supply for each operation is proportional to the number of revolutions performed by the driving shaft 4. In consequence the work can always be increased at will by interposing a speed reducing gear train between the motor shaft 4 and the cam shaft 7, with the sole proviso that the emission be prolonged during a sufficient interval of time to ensure that the operations be carried out.

It should likewise be pointed out that the advantage of eliminating the effects of any parasitic currents of short duration is obtained by using a large speed reduction between the shafts 4 and 7.

Hence the mounting of cams serving to throw the ratchets out of action, on a shaft driven through a speed reduction gear train is therefore of prime importance.

The use of the stops 9, 9', 9'' is moreover indispensable in order to avoid the vibrations which could affect the action of the pawls 2, 2', 2''.

By way of modification, it would be possible to mount in the circuit feeding the windings 15 and 16, over and above the capacity 17, two choke circuits A, B Fig. 1 respectively tuned to enter into resonance, one for a frequency between $f$ and $f'$, and the other for a frequency between $f'$ and $f''$. In this way a circuit of several waves of known composition would be obtained which could resonate for each of the frequencies $f$, $f'$ and $f''$.

I claim:

1. An electrical servo-motor device comprising, in combination, an electric circuit in which alternating currents of different frequencies flow successively, means in said circuit for producing alternating fluxes of the frequency of said currents respectively, a plurality of vibrating magnetic elements acted on by said fluxes and whose natural periods of vibration correspond respectively to the flux frequencies utilized, a plurality of mechanical means for respectively converting the vibrations of said magnetic elements into a unidirectional movement of rotation, and a plurality of declutching means respectively disengaging said movement converting means as said servo-motor completes the corresponding operation to be performed.

2. An electrical servo-motor device comprising, in combination, an electric circuit in which alternating currents of different frequencies flow successively, a polarized electromagnet in said circuit, a plurality of vibrating magnetic reeds acted on by said electromagnet and whose natural periods of vibration correspond respectively to the different frequencies used, a plurality of mechanical means for respectively converting the vibrations of said magnetic reeds into unidirectional rotational movement, and a plurality of declutching means respectively disengaging said movement converting means as said servo-motor completes the corresponding operation to be performed.

3. An electrical servo-motor device comprising, in combination, an electric circuit in which alternating currents of different frequencies flow successively, a polarized electromagnet in said circuit, a plurality of vibrating magnetic reeds acted on by said electromagnet and whose natural periods of vibration correspond respectively to the different current frequencies, a plurality of ratchet mechanisms for respectively converting the vibrations of said magnetic reeds into a unidirectional movement of rotation, and cams actuated through said unidirectional rotation for rendering said ratchet mechanisms respectively inoperative as said servo-motor completes the corresponding operation to be performed.

4. An electrical servo-motor device comprising, in combination, an electric circuit in which alternating currents of different frequencies flow successively, a polarized electromagnet in said circuit, a plurality of vibrating magnetic reeds acted on by said electro-magnet and whose natural periods of vibration correspond respectively to the different current frequencies, ratchet mechanisms including a plurality of springs respectively secured to said reeds, for converting the vibrations of said reeds into a unidirectional movement of rotation, stops for limiting the displacement of said springs, and cams actuated through said unidirectional movement of rotation for rendering said ratchet mechanisms respectively inoperative as said servo-motor completes the corresponding operation to be performed.

5. An electrical servo-motor device comprising, in combination, an electric circuit in which alternating currents of different frequencies flow successively, a polarized electromagnet in said circuit, a tuning capacity inserted in said circuit, a plurality of vibrating magnetic reeds acted on by said electro-magnet and whose natural periods of vibration correspond respectively to the different current frequencies, a plurality of ratchet mechanisms for respectively converting the vibrations of said magnetic reeds into a unidirectional movement of rotation, and cams actuated through said unidirectional rotation for rendering said ratchet mechanisms respectively inoperative as said servo-motor completes the corresponding operation to be performed.

6. An electrical servo-motor device comprising, in combination, an electric circuit in which alternating currents of different frequencies flow successively, a polarized electromagnet in said circuit, a tuning capacity inserted in said circuit, a plurality of choke arrangements inserted in said circuit and respectively tuned to oscillate for values between consecutive pairs of said frequencies used, a plurality of vibrating magnetic reeds acted on by said electro-magnet and whose natural periods of vibration respectively agree with the different frequencies used, a plurality of ratchet mechanisms for respectively converting the vibrations of said magnetic reeds into a unidirectional movement of rotation, and cams actuated through said unidirectional rotation for rendering said ratchet mechanisms respectively inoperative as said servo-motor completes the corresponding operation to be performed.

MAURICE CHIROL.